(12) United States Patent  
Raducan et al.

(10) Patent No.: US 9,239,957 B2  
(45) Date of Patent: Jan. 19, 2016

(54) IMAGE PROCESSING METHOD AND APPARATUS

(71) Applicant: DigitalOptics Corporation Europe Limited, Ballybrit, Galway (IE)

(72) Inventors: Ilariu Raducan, Galway (IE); Ruxandra Vranceanu, Bucharest (RO); Razvan Condorovici, Bucharest (RO); Cosmin Stan, Bucharest (RO); Peter Corcoran, Claregalway (IE)

(73) Assignee: FotoNation Limited, Ballybrit, Galway (IE)

( * ) Notice: Subject to any disclaimer, the term of this patent is extended or adjusted under 35 U.S.C. 154(b) by 0 days.

(21) Appl. No.: 14/506,150

(22) Filed: Oct. 3, 2014

(65) Prior Publication Data

US 2015/0286854 A1  Oct. 8, 2015

Related U.S. Application Data

(60) Provisional application No. 61/975,262, filed on Apr. 4, 2014.

(51) Int. Cl.
*G06K 9/00* (2006.01)
*G06F 17/30* (2006.01)
*G06T 5/00* (2006.01)

(52) U.S. Cl.
CPC ...... *G06K 9/00597* (2013.01); *G06F 17/30244* (2013.01); *G06K 9/0061* (2013.01); *G06T 5/005* (2013.01); *G06K 9/00604* (2013.01); *G06K 2009/00953* (2013.01)

(58) Field of Classification Search
CPC .......... G06K 9/00597; G06K 9/00604; G06K 9/0061; G06K 2009/00953

USPC .................................. 382/117, 115, 173, 181
See application file for complete search history.

(56) References Cited

U.S. PATENT DOCUMENTS

| 7,120,607 | B2* | 10/2006 | Bolle et al. ...................... 705/64 |
| 7,986,816 | B1* | 7/2011 | Hoanca et al. ................. 382/115 |
| 8,385,685 | B2* | 2/2013 | Bedros et al. .................. 382/284 |
| 2006/0029262 | A1* | 2/2006 | Fujimatsu et al. ............. 382/117 |
| 2009/0141946 | A1* | 6/2009 | Kondo et al. ................... 382/117 |
| 2010/0046805 | A1* | 2/2010 | Connell et al. ................. 382/115 |
| 2010/0046808 | A1* | 2/2010 | Connell et al. ................. 382/117 |
| 2011/0185176 | A1* | 7/2011 | Takahashi et al. ............. 713/168 |
| 2014/0184852 | A1* | 7/2014 | Niemi et al. ................... 348/239 |

OTHER PUBLICATIONS

Mateos, et al. "Software Development Kit to Verify Quality Iris Images." BIOCOMP'12—The 2012 International Conference on Bioinformatics and Computational Biology (2012): 1-5. Print.*

(Continued)

*Primary Examiner* — Michael A Newman
(74) *Attorney, Agent, or Firm* — Hickman Palermo Becker Bingham LLP (57) ABSTRACT

A method of image processing within an image acquisition device comprises: acquiring an image including one or more face regions and identifying one or more eye-iris regions within the one or more face regions. The one or more eye-iris regions are analyzed to identify any eye-iris region comprising an eye-iris pattern of sufficient quality to pose a risk of biometrically identifying a person within the image. Responsive to identifying any such eye-iris region, a respective substitute eye-iris region comprising an eye-iris pattern sufficiently distinct from the identified eye-iris pattern to avoid identifying the person within the image is determined, and the identified eye-iris region is replaced with the substitute eye-iris region in the original image.

25 Claims, 4 Drawing Sheets

(56) References Cited

OTHER PUBLICATIONS

Jenisch, et al. "Security Analysis of a Cancelable Iris Recognition System Based on Block Remapping." IEEE International Conference on Image Processing 18 (2011): 3274-277. Print.*

Mateos et al. "Software Development Kit to Verify Quality Iris Images." BIOCOMP'12—The 2012 International Conference on Bioinformatics and Computational Biology (2012): 1-5. Print.*

Jenisch et al. "Security Analysis of a Cancelable Iris Recognition System Based on Block Remapping." IEEE International Conference on Image Processing 18 (2011): 3274-277. Print.*

* cited by examiner

IMAGE PROCESSING METHOD AND APPARATUS

BENEFIT CLAIM

This application claims the benefit under 35 U.S.C. §119 (e) of U.S. Provisional Application No. 61/975,262, filed Apr. 4, 2014, the entire contents of which is hereby incorporated by reference as if fully set forth herein.

FIELD OF THE DISCLOSURE

The disclosure provides an image processing method and an apparatus for eye-iris obfuscation.

BACKGROUND

The eye-iris surrounds the dark, inner pupil region of an eye and extends concentrically to the white sclera of the eye.

A. K. Jain, A. Ross, and S. Prabhakar, "An introduction to biometric recognition," IEEE Trans. Circuits Syst. Video Technol., vol. 14, 2004 discloses that the eye-iris of the eye is a near-ideal biometric.

For the purposes of recognition, typically an image of an iris region is acquired in a dedicated imaging system that uses infra-red (IR) illumination with the eye aligned with the acquisition camera to bring out the main features of the underlying iris pattern.

An iris pattern is a gray-scale/luminance pattern evident within an iris region that can be processed to yield an iris code. The iris pattern can be defined in terms of polar co-ordinates and these are typically converted into rectangular coordinates prior to analysis to extract the underlying iris code.

An iris code is a binary sequence obtained after analysis of the iris pattern. A typical iris code contains 2048 bits. Note that some bits are effectively redundant, or 'fragile', as they are nearly always set to a '1' or a '0' as disclosed in K. Hollingsworth, K. W. Bowyer, and P. J. Flynn, "All Iris Code Bits are Not Created Equal," 2007 First IEEE Int. Conf. Biometrics Theory, Appl. Syst., 2007. Some of these fragile bits can be predicted in advance and as they offer less differentiation, and are often ignored when determining a match.

Nonetheless, systems supporting the acquisition of iris data from mobile persons are known, for example, as disclosed in J. R. Matey, O. Naroditsky, K. Hanna, R. Kolczynski, D. J. LoIacono, S. Mangru, M. Tinker, T. M. Zappia, and W. Y. Zhao, "Iris on the Move: Acquisition of Images for Iris Recognition in Less Constrained Environments," Proc. IEEE, vol. 94, 2006. This employs specialized lighting and requires people to walk along a specified path where multiple successive iris images are acquired under controlled lighting conditions. The system is proposed for airports where iris information is being used increasingly to verify passenger identity.

Separately, each of: C. Boyce, A. Ross, M. Monaco, L. Hornak, and X. L. X. Li, "Multispectral Iris Analysis: A Preliminary Study51," 2006 Conf. Comput. Vis. Pattern Recognit. Work., 2006; M. Vilaseca, R. Mercadal, J. Pujol, M. Arjona, M. de Lasarte, R. Huertas, M. Melgosa, and F. H. Imai, "Characterization of the human iris spectral reflectance with a multispectral imaging system.," Appl. Opt., vol. 47, pp. 5622-5630, 2008; and Y. Gong, D. Zhang, P. Shi, and J. Yan, "Optimal wavelength band clustering for multispectral iris recognition," Applied Optics, vol. 51. p. 4275, 2012 suggest that iris patterns from lighter color eyes can be adequately acquired, but that eyes of darker color are difficult to analyze using visible light, H. Proenca and L. A. Alexandre, "Iris segmentation methodology for non-cooperative recognition," IEE Proceedings—Vision, Image, and Signal Processing, vol. 153. p. 199, 2006; and A. E. Yahya and M. J. Nordin, "Non-cooperative iris recognition system: A review," Inf. Technol. (ITSim), 2010 Int. Symp., vol. 1, 2010 disclose non-cooperative iris acquisition, typically obtained at a distance of 3-10 meters using directed IR sources.

As imaging subsystems on smartphones continue to improve in quality of acquisition and as image analysis and post-processing technique also continue to improve, a point at which the quality of images from conventional digital cameras and smart-phones becomes of sufficient quality to analyze to a sufficient degree to determine some of the underlying features of an iris pattern will be reached.

For example, U.S. Pat. No. 7,697,735 discloses identifying a person from face and iris data from a single 5 megapixel image. U.S. Pat. No. 7,697,735 provides recommended minimum sizes for face and eye features to enable a sufficiently accurate degree of recognition. However, it does not specify any details of lighting or acquisition conditions, and most iris acquisitions would not be of sufficient accuracy in an unconstrained use case. Nevertheless, we note that the latest handheld devices can feature imaging subsystems with up to 40 megapixel resolutions, and high power IR LEDs can be used to improve acquisition lighting conditions.

Other techniques such as high dynamic range (HDR) imaging combine more than one digital image to provide a combined image with improved image quality. This is a standard feature on most smartphone imaging systems and typically two images are acquired in sequence and combined, post-acquisition, to provide a sharper and higher quality final image. Techniques are well known in the literature to combine more than one image and, as acquisition systems achieve higher frame rates (currently 60-120 frames per second for preview but likely to double with next-generation technology), it will be practical to capture as many as 8-10 images within the same time window used today to acquire two images. Taking advantage of sub-pixel registration or super-resolution techniques will therefore provide images with significantly higher local image contrast and sharpness than today's devices provide.

Thus it highly likely that images acquired with the next generation of imaging devices will be of sufficient quality to enable the determination of iris patterns from faces in standard images. This makes normal personal portraits and small-group photos a potential source for personal iris patterns with a high risk of such biometric information being used for a range of criminal activities ranging from identity theft, forging of personal identity documents up to gaining access to facilities protected by biometric security measures.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In an embodiment, an image processing device is provided as claimed in claim 1.

In an embodiment, an apparatus is provided that is configured to (i) identify candidate iris regions within digital images; (ii) segment and analyze such regions to determine if they provide an iris pattern of sufficient quality to pose a risk of theft of the associated biometric; (iii) determine and calculate a suitable substitute biometric of similar appearance and aesthetic quality, and (iv) on storage, transmission or otherwise making permanent the original image data the at-risk iris patterns are substituted in the original image.

In an embodiment, a method is provided as claimed in claim 16.

In an embodiment, a computer program product is provided. The computer program product comprises a computer readable medium on which instructions are stored and executed according to the steps of claim 22.

BRIEF DESCRIPTION OF THE DRAWINGS

In the drawings of certain embodiments in which like reference numerals refer to corresponding parts throughout the figures:

FIG. 3(*a*) is a flow diagram illustrating an iris analysis component of an image processing method using a biometric authentication unit (BAU);

FIG. 3(*b*) is a flow diagram illustrating an iris analysis component of an image processing method without biometric authentication;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Figure 1:
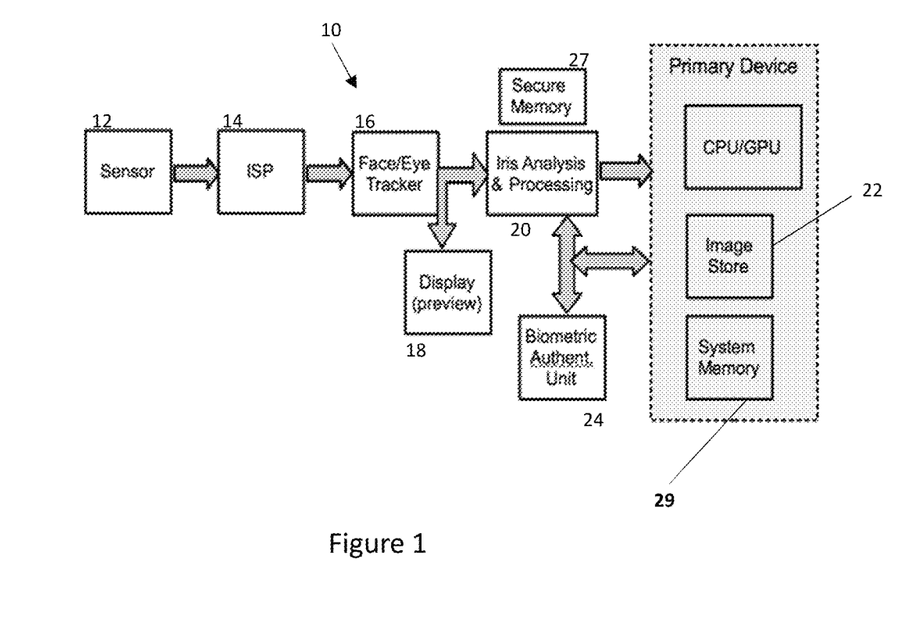
FIG. 1 shows an image processing system according to an embodiment.

Referring now to FIG. 1, there is shown a digital imaging processing device 10 for performing image processing according to an embodiment of the present approach. The device may comprise for example, a camera, a smartphone, a tablet, etc. including an image sensor 12 connected to an image signal processor/pipeline 14, which provides images for processing by the remainder of the system. The device may or may not include an IR light source. The images can include a stream of low or full resolution images used for preview or for generating video as well as full resolution still images selectively captured by the user.

Face detection in real-time has become a standard feature on most digital imaging devices, for example, as disclosed in WO2008/018887. Further, most cameras and smartphones also support the real-time detection of various facial features and can identify specific patterns such as 'eye-blink' and 'smile' so that for example, the timing of main image acquisition can be adjusted to ensure subjects, such as persons, within a scene are in-focus, not blinking or are smiling such as disclosed in WO2007/106117. Other approaches substitute in-focus, non-blinking or smiling portions of preview images into corresponding out-of-focus, blinking or non-smiling portions of main images to improve image quality for example as disclosed in WO2008/150285. Where such functionality is available in an image processing device, detecting and tracking face regions and eye regions within those face regions imposes no additional overhead and so this information is available continuously for an image stream.

In the present embodiment, a face/eye tracking subsystem 16 locates and tracks face regions within an image stream. However, it will be appreciated that a face/eye detection subsystem could simply be applied to single still images to detect any, face, and eye regions within the image.

Figure 2:
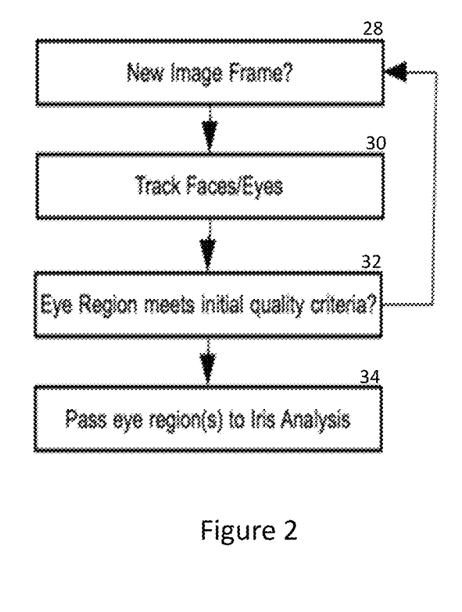
FIG. 2 is a flow diagram illustrating a preliminary processing.

In any case, the face/eye sub-system 16 acquires either a still image or an image from a stream, step 28, and then, locates eye-regions within any detected face regions in the image, step 30, FIG. 2. The sub-system 16 performs some rudimentary calculations to provide an estimate of the quality of eye-regions based on face detection and any frame-to-frame tracking of the face region(s), step 32. In many images, any face(s) will be sufficiently distant so that any acquired eye region(s) will not be large enough to enable the extraction of a useful iris pattern. Eye regions in such images and can be safely ignored. Thus, the calculations at this stage can fall generally into the categories of: basic eye size, focus, local contrast/sharpness.

Preview images can be displayed in a display 18 and in some cases tracked face or eye regions can be indicated in the preview display.

The face/eye tracking subsystem 16 thus detects candidate eye regions and potential 'at risk' candidates can be flagged as the image or image stream is being processed. As indicated, the quality criteria used by the face/eye tracking subsystem 16 at step 32 can be quite rudimentary, and additional, more detailed analysis can be made at the time when an acquisition is completed, and an image (or image sequence) is (being) committed to storage 22 or transmitted beyond the device over a network connection (not shown).

Once a user initiates an action that will commit an image to permanent or semi-permanent storage 22, the sub-system 16 initiates the check to determine if the image (or image sequence) contains 'at risk' eye regions. If none are present, then the image is saved normally. However, if the image meets criteria for the above parameters, then 'at risk' regions are present, and these eye regions may contain iris regions which may need to be substituted as described in more detail below. In this case, they are passed by the sub-system 16 to an iris analysis and processing sub-system 20 at step 34. The output image of sub-system 16 and 24 is then stored or transmitted to or otherwise made permanent on permanent or semi-permanent storage 22.

Figure 3A:
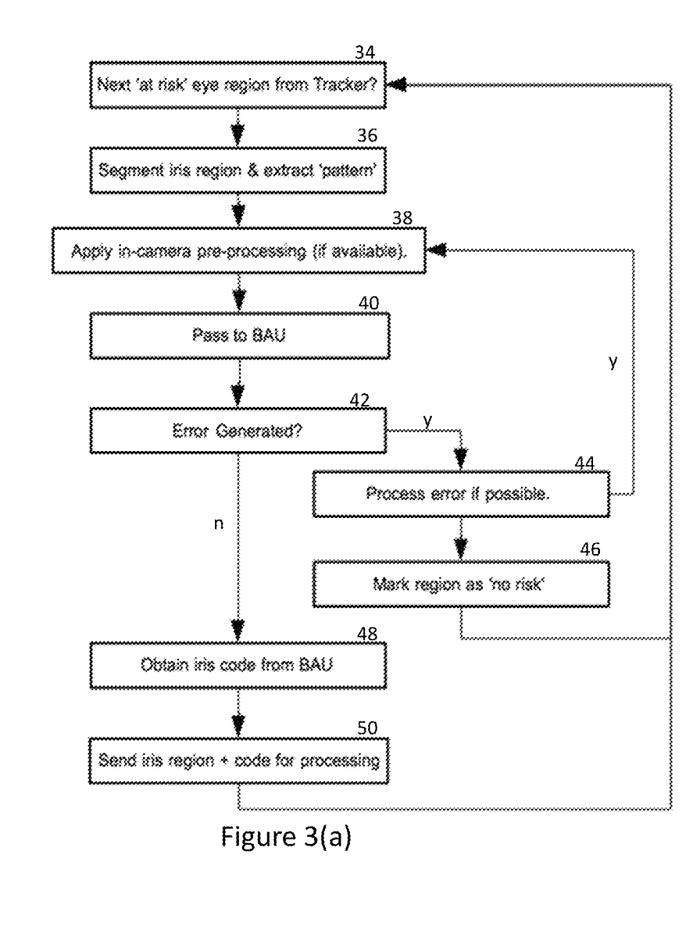
Figure 3B:
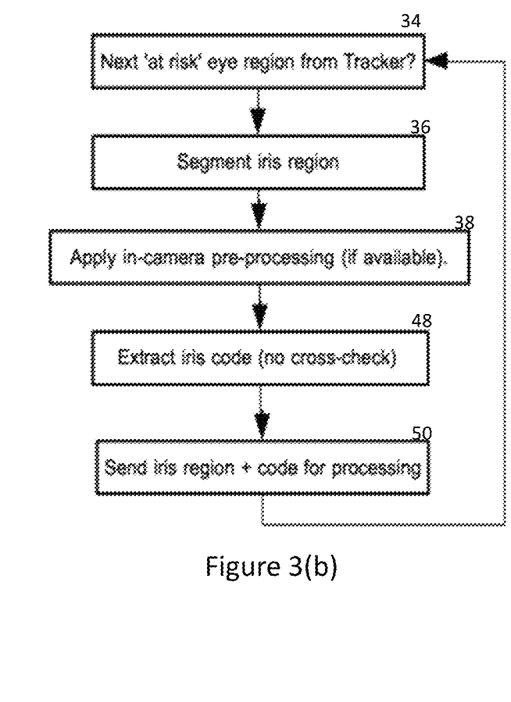

FIG. 3(*a*) shows an example of this iris analysis performed by the sub-system 20 including passing an image through a biometric authentication unit (BAU) 24, whereas the example shown in FIG. 3(*b*) does not employ the BAU 24. Similar numerals are employed in each example to indicate equivalent steps.

Firstly, at step 36, the iris regions are extracted from 'at risk' eye regions and a more detailed analysis performed to confirm if a valid iris pattern is detectable. The iris region can be determined by edge analysis or Hough-transform. J. Daugman, "New methods in iris recognition," IEEE Trans. Syst. Man. Cybern. B. Cybern., vol. 37, pp. 1167-1175, 2007 discloses a range of additional refinements, which can be utilized to determine the exact shape of iris and the eye-pupil. It is also common practice to transform the iris from a polar to rectangular co-ordinate system, although this is not necessary. The end result of this process is an iris region separated from the main image with a secondary inner-boundary corresponding to the iris/pupil boundary of the eye. This approximately doughnut-shaped region provides the input for the next stage of iris analysis.

Embodiments of the present approach can employ combinations of the following criteria to confirm if extracted iris regions are at risk of providing a pattern which enables recognition:

1. Usable Iris Size/Area is defined herein as the extent of iris that is not occluded by eyelash, eyelids and reflections. Iris regions extending more than 120 horizontal pixels are regarded as guaranteeing a high accuracy of recognition and so are regarded as especially at risk. In embodiments of the approach, a threshold of between 50 and 100 horizontal pixels is chosen to signal an iris region may be at risk of recognition and so requires obfuscation.

2. Iris Shape is defined here in as a measure of regularity of pupil-iris boundary—it should be noted that the iris region just around the pupil has high information content. In the embodiment, the iris-pupil boundary shape is matched with an ellipse—although in some embodiments, a circular test can be employed. An accurate fitting with an elliptical (or circular) approximation is taken as sufficient to indicate that an iris region is 'at risk' from the perspective of iris boundary shape quality. In other embodiments, active-snake contours or other conventional contour matching techniques may be employed to provide a measure of iris boundary shape. Preference is given to techniques that are optimized for embedded or hardware based embodiments.

3. Iris-pupil/Iris-sclera contrast is a contrast at these boundaries that makes iris recognition more likely. It will be appreciated that contrast within an image is dependent on the acquisition conditions. In low-lighting, for example, only a narrow range of contrast can be achieved by most conventional imaging systems. An image obtained under good acquisition conditions will use the full contrast range of the imaging device, although across the entire image. Local contrast is defined herein as the contrast across the eye region and more specifically across the iris itself. The local contrast may be restricted to quite a limited range sub-range of the overall contrast range. Local contrast enhancement can be used to greatly increase contrast within a specific region of an image. In its simplest form, this involves a linear rescaling of local luminance values across the full range of values. More sophisticated techniques use a more adaptive approach, scaling values in one or more sub-ranges according to different weightings or even in a non-linear manner. In embodiments of the present approach, the local range of luminance variations within the eye and iris region are compared with those of the overall image. The size of the iris region is also considered because a greater and more accurate degree of contrast enhancement can be achieved if more image pixels are available. As a basic rule of thumb, a 150 pixel wide iris region can achieve a doubling of its underlying contrast range while still retaining sufficient spatial resolution; while a 300 pixel wide iris region can achieve a quadrupling, and so on. The potential increase in local contrast is clearly limited by the range of global image contrast and the presence of noise sources. For example, specular reflections and overexposed image regions indicate that the range of global contrast is already over-extended. Thus, in embodiments, the iris region is analyzed to determine how significantly the contrast range can be extended. If this suggests that a viable iris pattern could be extracted through advanced post-processing techniques, then it may be necessary to substitute the current iris pattern.

4. Gaze Angle is the deviation of optical axis of a person's iris from the optical axis of camera. Clearly, the more directly a person looks into the imaging device at acquisition time, the likelihood of producing a recognizable iris pattern increases.

5. Sharpness/defocus blur denotes that the sharper and more in focus an image and its eye regions are, the more likely the image is to yield a recognizable iris pattern.

It should be noted that each of the above quality measures can be determined on a real-time basis within a current state-of-art digital imaging device. Other schemes for assessing iris quality are provided in:

E. Tabassi, P. Grother, and W. Salamon, "IREX II—Iris Quality Calibration and Evaluation (IQCE): Performance of Iris Image Quality Assessment Algorithms," 2011;

J. Z. J. Zuo and N. A. Schmid, "Global and local quality measures for NIR iris video," 2009 IEEE Comput. Soc. Conf. Comput. Vis. Pattern Recognit. Work, 2009;

D. S. Jeong, J. W. Hwang, B. J. Kang, K. R. Park, C. S. Won, D. K. Park, and J. Kim, "A new iris segmentation method for non-ideal iris images," Image Vis. Comput., vol. 28, pp. 254-260, 2010;

J. M. Colores, M. Garcia-Vazquez, A. Ramirez-Acosta, and H. Perez-Meana, "Iris Image Evaluation for Non-cooperative Biometric Iris Recognition System," in Advances In Soft Computing, Pt Ii, vol. 7095, 2011, pp. 499-509;

N. D. Kalka, J. Z. J. Zuo, N. A. Schmid, and B. Cukic, "Estimating and Fusing Quality Factors for Iris Biometric Images," IEEE Trans. Syst. Man, Cybern.—Part A Syst. Humans, vol. 40, 2010; and W. D. W. Dong, Z. S. Z. Sun, T. T. T. Tan, and Z. W. Z. Wei, "Quality-based dynamic threshold for iris matching," Image Process. (ICIP), 2009 16th IEEE Int. Conf., 2009.

If the designated criteria for an iris region are met, then the iris pattern and the color of the iris region are provided.

In some embodiments, an iris pattern may be evaluated and compared against a set of known patterns—e.g. the owner of the device and perhaps family members and friends. Certain actions may be pre-programmed according to the identified person, for example, the device may also signal the user of the device that 'at risk' iris patterns have been identified and are being substituted, step 38.

In the embodiment of FIG. 3(*a*), the digital imaging system/device 10 contains a biometric authentication unit (BAU) 24 that can perform iris code extraction from valid iris patterns. So, for example, the BAU may be employed by the device or other applications running on the device to authenticate a user and for example, to unlock the device or unlock a specific application running on the device.

At step 40, the BAU extracts the relevant iris code from the detected iris pattern and records this temporarily in storage media such as either secure memory 27 or system memory 29. Where a BAU is available, this step is used as an additional test of the quality of detected 'at risk' iris regions. Thus, if an 'at risk' region is rejected by the BAU, step 42, then an error code from the BAU can verify that certain quality metrics are not met or that other aspects of the region prevent a useful biometric being extracted.

Nonetheless, it may be possible to correct the iris region, step 44, for example, with an alternative contrast enhancement such as outlined above, and to then re-submit the iris region for BAU analysis—this may involve again checking the enhanced iris against known patterns at step 38. This loop may be performed iteratively until all possible error corrections have been attempted.

If error correction is not possible or exhausted, step 46, the iris region is re-marked as not being at risk.

Where a BAU is not available, as in FIG. 3(*b*), embodiments operate in an unverified mode where it will not be possible to test the similarity between the original and a replacement iris pattern. However, in the embodiment of FIG. 3(a), this test is performed and provides the user with additional security.

In any case, if an iris code can be extracted from the iris region, either with or without a BAU, step 48, the iris is selected to be submitted for further processing, step 50 where a replacement iris pattern and ultimately a replacement iris region is provided.

Furthermore, it should be noted that a unique replacement iris need not be required for every image. In some embodiments, a new replacement iris is only provided when a new iris pattern is identified, for example in step 38. Thus, where a device keeps a local information dataset for a group of persons that are regularly photographed or videoed by the user of the device, each person can have a unique replacement iris pair, possibly stored in storage media, which is used whenever they are identified in an image. Another set of replacement iris patterns can be used for unidentified persons. In such embodiments, a device only needs to occasionally obtain or generate a set of replacement iris patterns. This may be implemented in-camera, but equally these may be obtained via a secure network service or a specialized app running on the device.

Embodiments of the approach attempt to generate or obtain a natural looking iris to substitute for the original iris detected in an acquired image as described in FIGS. 2 and 3. Preferably, an alternative iris is substituted for an original iris so as to retain a natural appearance, so as to avoid associating subjects in an image with their own biometrics.

Figure 4:
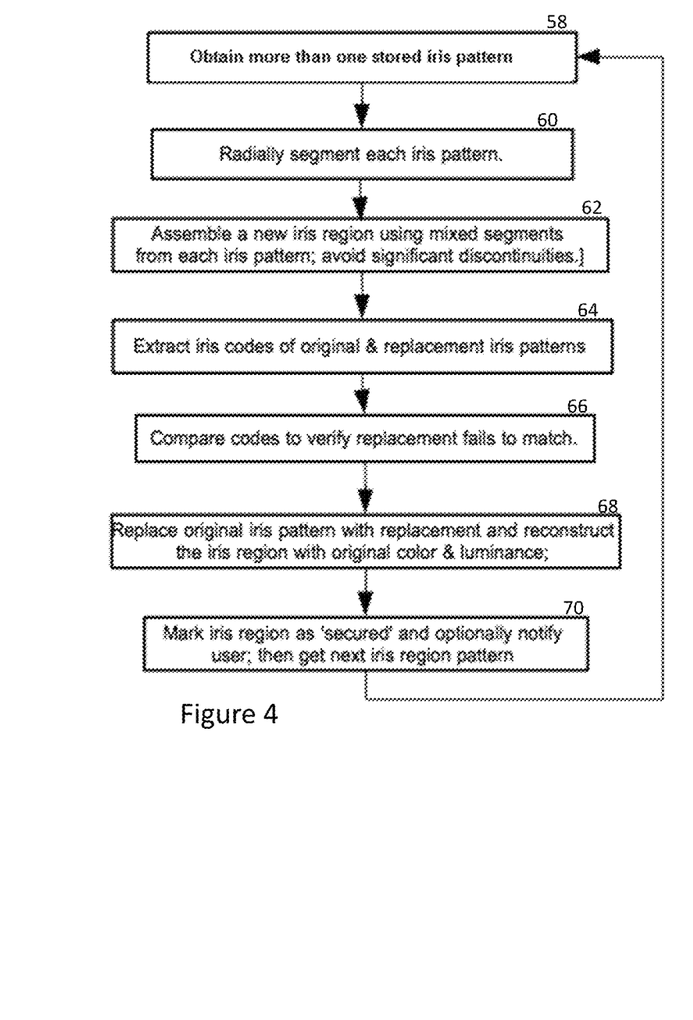
FIG. 4 illustrates an approach for generating replacement irises and for iris substitution.

Providing and substituting an iris may be achieved in a number of ways. Referring now to FIG. 4, in a first approach, for any given iris region within an image for which a replacement iris is required, steps 58-70 are performed. In step 58, a set of iris patterns are retrieved from a database of original iris patterns, preferably stored in secure memory 27. A replacement iris pattern is created through combining two or more of these patterns. The combining of patterns is achieved by first performing a radial segmentation of each stored iris pattern, step 60. Subsequently, mixing/substituting segments from patterns that have a similar angle of segmentation, is performed to generate a single, combined iris pattern, step 62. In this embodiment the original color of each iris is also stored, and the patterns used to generate a replacement pattern are taken from eyes with a different eye-color.

In steps 64 and 66, the iris code for a replacement iris pattern is extracted and compared with the code for the original iris pattern to verify that the patterns are sufficiently distinct. A standard metric for comparing patterns is Hamming Distance (HD). Ideally, for two iris images acquired from the same eye, the HD of the extracted codes would be zero, and for two completely random iris images, HD would theoretically be 0.5 (equal number of matching and non-matching code bits). In practice because each iris code contains a significant number of fragile bits, an HD of approximately 0.33 to 0.35 can be used as a discriminating threshold value, as disclosed in J. Daugman, "Probing the Uniqueness and Randomness of Iris Codes: Results From 200 Billion Iris Pair Comparisons," Proc. IEEE, vol. 94, 2006. In some embodiments of the approach, the threshold for Hamming Distance could be user selected within the range 0.33 to 0.5 or it could be a function of a user's chosen security settings, so that a higher HD would be employed for more security conscious users If the codes are sufficiently distinct, the embodiment then continues by generating a replacement iris region based on the replacement iris pattern and re-constructing the iris region within the original image based on the replacement iris region, step 68. This step includes matching and blending the luminance, color and any specular reflections or eye glint from the original 'at risk' region so that the replacement eye region presents a substantially similar appearance. This will be described in more detail below, but as will be appreciated, once this step is complete, the image and/or the iris region within the image can be marked as secure, step 70, and the method can proceed to process any further 'at risk' iris patterns identified within the image by returning to step 58.

Where a replacement iris pattern has previously been generated for an iris pattern recognized within an image, steps 58-66 can be skipped. Thus, the previously generated replacement iris pattern may be simply retrieved from storage media before continuing with steps 68 and 70.

As mentioned above, conventional iris based BAU typically use a gray-scale iris pattern as a starting point. This practice originates from the use of IR illumination to enhance the iris pattern to obtain the resulting single-channel image data (gray-scale).

If an authentication system employs a color check in addition to a BAU, then stored iris patterns used in in the approach of FIG. 4 are also afforded protection from reverse-engineering. Thus, according to this additional feature, even if the iris pattern segments are identified and reverse-engineered, it is not possible to know the original color of the eye that provided a particular pattern.

In such an embodiment the iris patterns of friends and family can be used to generate replacement patterns for each other.

In a first alternative to the approach of FIG. 4, instead of steps 58-62, a replacement iris pattern is determined from the original iris pattern by patch-based sampling of the type described in U.S. Pat. No. 6,762,769, Guo et al, rather than segment swapping.

This technique has been employed for synthesizing irises, for example, as disclosed in Z. Wei, T. Tan, and Z. Sun, "Synthesis of large realistic iris databases using patch-based sampling," 2008 19th Int. Conf. Pattern Recognition, no. 1, pp. 1-4, December 2008. Also, L. Liang, C. Liu, Y.-Q. Xu, B. Guo, and H.-Y. Shum, "Real-time texture synthesis by patch-based sampling," ACM Transactions on Graphics, vol. 20. pp. 127-150, 2001 discloses patch-based sampling to scramble a known iris pattern while retaining a realistic looking eye region.

In another alternative to the embodiment of FIG. 4, instead of interchanging segments of various stored iris patterns, stored iris patterns can be combined using patch-based-sampling techniques, as described above, by combining patches from more than one iris pattern.

In another alternative, especially useful where a BAU is not available, instead of steps 58-66, the iris code for the original iris is scrambled and used as a basis for reconstructing a replacement iris pattern. (Note that because an iris code is typically derived from a transformation of the original iris pattern, there is a one-to-many relationship between an iris code and corresponding irises.) In this approach, the iris code of the 'at risk' region is determined. A range of bits of this code are then 'flipped;' typically of the order of 50% of bits are changed, but the exact number and relative locations of bits may be randomized. For example, bits known to be fragile might not be flipped as these are often masked by BAUs when comparing iris codes.

The remainder of this approach is based on the work described in S. Venugopalan and M. Savvides, "How to Generate Spoofed Irises from an Iris Code Template," IEEE Trans. Inf. Forensics Secur., vol. 6, pp. 385-395, 2011. Here, a unique discriminating pattern is next determined from the 'flipped' code (an anti-code for that of the original iris pattern), and a replacement iris pattern is generated on a neutral iris template. By flipping more than 50% of bits in the underlying iris code, a large Hamming Distance is ensured, and thus, cross-checking by a BAU is not required.

Another approach to constructing the replacement iris pattern of steps 58-62 is based on J. Galbally, A. Ross, M. Gomez-Barrero, J. Fierrez, and J. Ortega-Garcia, "Iris image reconstruction from binary templates: An efficient probabilistic approach based on genetic algorithms," Comput. Vis. Image Underst., vol. 117, pp. 1512-1525, 2013. Due to the computational complexity of these techniques, the replacement iris may need to be determined outside the image capture device—e.g. as a secure network service.

In still further embodiments, instead of steps 58-62, a synthesized, artificial or random iris pattern is generated using techniques described in, for example, S. Shah and A. Ross, "Generating Synthetic Irises by Feature Agglomeration," 2006 Int. Conf. Image Process., 2006; L. Wecker, F. Samavati, and M. Gavrilova, "A multi-resolution approach to iris synthesis," Comput. Graph., vol. 34, pp. 468-478, 2010; or L. Cardoso, A. Barbosa, F. Silva, A. M. G. Pinheiro, and H. Proenca, "Iris Biometrics: Synthesis of Degraded Ocular Images," vol. 8, no. 7, pp. 1115-1125, 2013; or other methods such as are reviewed in Venugopalan et al referred to above.

Figure 5:
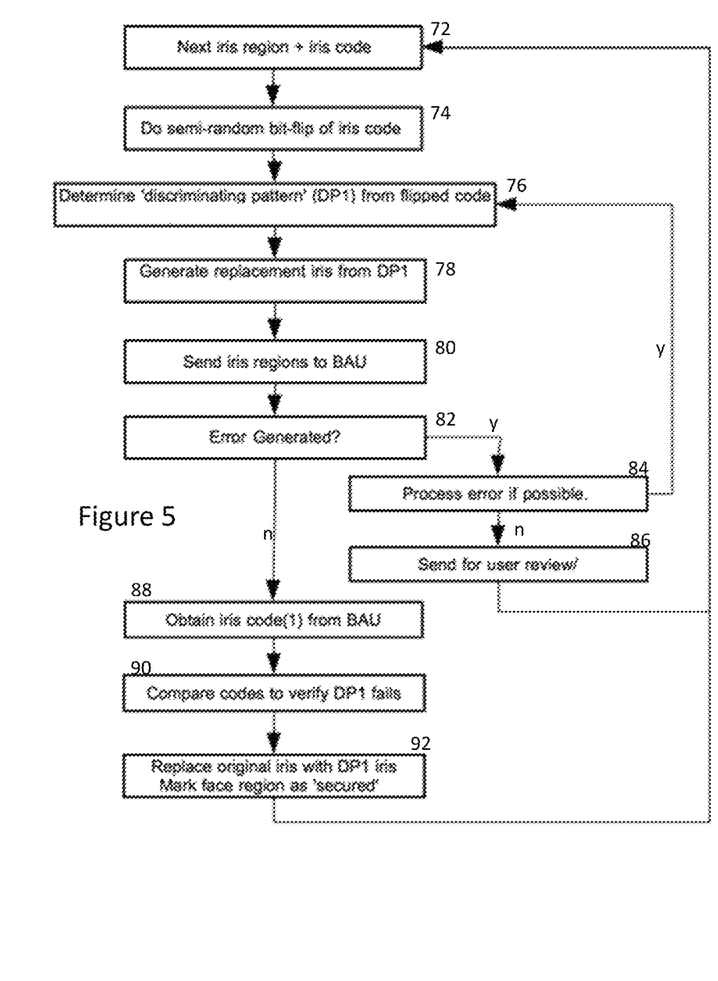
FIG. 5 illustrates an iris replacement approach employed in embodiments where a BAU is available.

FIG. 5 illustrates a still further approach to replacement iris generation and substitution, where a BAU is available.

Again, an iris region with a corresponding code which has not been recognized previously are provided, step 72. As in the alternative described above, a selected number of bits of the iris code are flipped, step 74. An iris pattern (DP1) is synthesized based on the flipped iris code, step 76, and an iris synthesized from the pattern DP1, step 76. The synthesized replacement iris is sent to a BAU, step 78 where it is analyzed, step 80.

If the BAU detects an error in the synthesized iris, an error is returned, step 82. There may be a possible solution, step 84, but if all solutions are exhausted and no suitable discriminating iris can be generated, the user is notified, step 86, and the process continues to step 72 and the next iris in the image for processing.

Otherwise, the BAU provides the iris code for the synthesized iris (this should correspond with the flipped code), step 88. The Hamming Distance between the respective synthesized and original iris codes can be determined, step 90. Again, in some embodiments of the approach, the threshold for Hamming Distance could be user selected within the range 0.33 to 0.5 or it could be a function of a user's chosen security settings, so that a higher HD would be employed for more security conscious users.

If the HD is suitably distinct, the process proceeds, step 92, by substituting the synthesized iris for the original iris as in step 70 of FIG. 4 and marking the image/iris accordingly.

In relation to the iris substitution performed in each of steps 70 and 92, it will be understand that a replacement and original iris may not be identical in size/shape and it can be necessary to blend the replacement iris into the original acquired image. In addition it is important to match the overall luminance and color of the original and replacement regions so that the replacement iris appears as natural as possible.

In one embodiment this substitution involves the following steps:

(i) The luminance distribution of the substitute iris region is brought to match that of the original target iris region. This is achieved by a histogram matching.

(ii) The replacement region is scaled to the size of the target iris.

(iii) An alpha blending mask is created. This blending mask is completely opaque over the actual iris and transparent over the pupil, cornea and eyelids. In some embodiments, the eye glint may also be incorporated into the blending mask.

(iv) The blending mask is blurred with a kernel that is sized adaptively. The purpose of this step is make the blended areas of the image gradually disappear into the surrounding regions.

(v) The luminance channel of the target image is blended with the replacement, based on the blending mask. For YCC or similar format images, the chroma (color) channels are untouched in order to preserve the original eye color.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
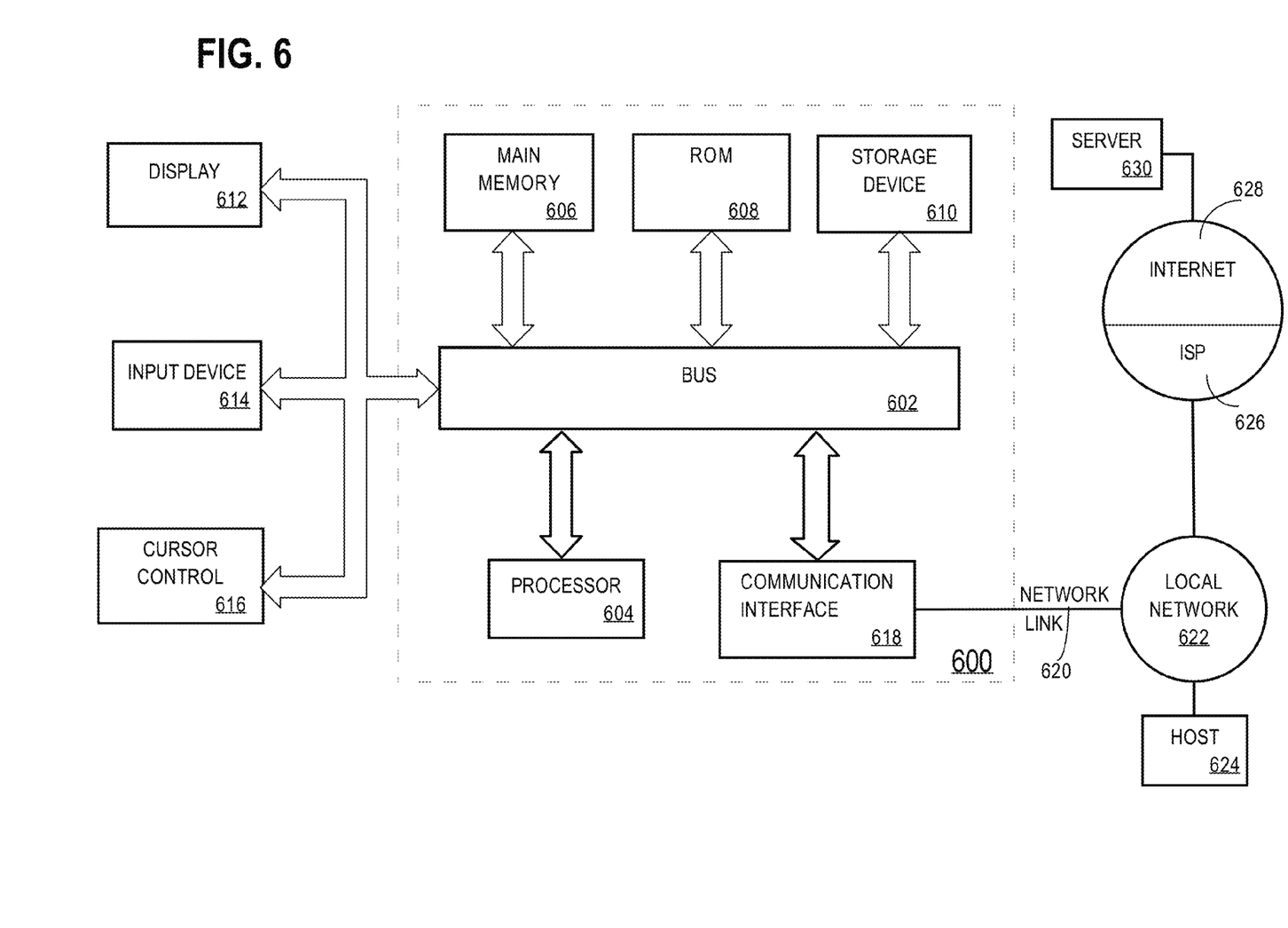
FIG. 6 is a block diagram that illustrates a computer system upon which an embodiment of the invention may be implemented.

For example, FIG. 6 is a block diagram that illustrates a computer system 600 upon which an embodiment of the approach may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

What is claimed is:

1. An image processing device comprising:
an image sensor for acquiring an image depicting one or more face regions; and
a processing module configured to:
select, from said one or more face regions, a particular face region that includes one or more eye-iris regions;
analyze the one or more eye-iris regions to select a particular eye-iris region that comprises a particular eye-iris pattern, which allows to biometrically identify a person depicted in said image;
submit one or more eye-iris patterns, from the one or more eye-iris regions, to a biometric authentication unit (BAU);
for the particular eye-iris pattern, from the one or more eye-iris patterns:
receive, from the BAU, a BAU generated eye-iris code confirming that the particular eye-iris pattern is of a quality insufficient to biometrically identify an individual;
adjust a contrast of the particular eye-iris pattern; and
in response to adjusting the contrast of the particular eye-iris pattern, re-submit the adjusted particular eye-iris pattern to the BAU for confirming that the adjusted particular eye-iris pattern is of a quality sufficient to biometrically identify the individual;
generate a substitute eye-iris region comprising a substitute eye-iris pattern that is distinct from the particular eye-iris pattern included in the particular eye-iris region;
wherein the substitute eye-iris pattern does not allow to biometrically identify said person;
replace, in the particular face region, the particular eye-iris region with the substitute eye-iris region; and
store, in a storage device, said image, which includes the substitute eye-iris region in the particular face region.

2. The image processing device of claim 1, wherein the processing module is further configured to:
  detect an eye region within said one or more face regions;
  determine, for the eye region, one or more details including one or more of: an eye size, focus, local contrast or sharpness; and
  based on the one or more details, determine that the particular eye-iris pattern from the eye region has a quality insufficient to biometrically identify an individual.

3. The image processing device of claim 1, wherein the processing module is further configured to:
  determine a size or an area of the particular eye-iris region; and
  based on the size or the area, determine that the particular eye-iris region has a quality sufficient to biometrically identify an individual.

4. The image processing device of claim 1, wherein the processing module is further configured to:
  determine a shape of the particular eye-iris region; and
  based on the shape, determine that the particular eye-iris region has a quality sufficient to biometrically identify an individual.

5. The image processing device of claim 1, wherein the processing module is further configured to:
  determine a local contrast of the particular eye-iris region between a pupil and a sclera; and
  based on the local contrast, determine that the particular eye-iris region has a quality sufficient to biometrically identify an individual.

6. The image processing device of claim 1, wherein the processing module is further configured to:
  store, in the storage device, the particular eye-iris region as a possible substitute eye-iris region for other persons.

7. The image processing device of claim 1, wherein the processing module is further configured to:
  retrieve two or more eye-iris patterns from the storage device;
  segment the two or more eye-iris patterns to generate a plurality of eye-iris segments; and
  generate the substitute eye-iris region from two or more eye-iris segments of the plurality of eye-iris segments that have a similar angle of segmentation with each other.

8. The image processing device of claim 1, wherein the processing module is further configured to:
  synthesize a new eye-iris pattern by patch sampling one or more eye-iris patterns; and
  generate the substitute eye-iris region from the new eye-iris pattern.

9. The image processing device of claim 1, wherein the processing module is further configured to:
  compare the substitute eye-iris pattern with the particular eye-iris pattern; and
  based on the comparison, determine a distinction metric between the substitute eye-iris region and the particular eye-iris region.

10. The image processing device of claim 9, wherein:
  the distinction metric is a Hamming Distance;
  wherein the processing module is further configured to:
    extract a new eye-iris code from the substitute eye-iris pattern;
    calculate the Hamming Distance based on the BAU generated eye-iris code and the new eye-iris code; and
    compare the Hamming Distance with a threshold to determine if the substitute eye-iris region is sufficiently distinct from the particular eye-iris region.

11. The image processing device of claim 1, wherein the processing module is further configured to: blend the substitute eye-iris region into the particular eye-iris region within said image.

12. The image processing device of claim 11, wherein the processing module is further configured to:
  match a luminance distribution of the substitute eye-iris region with a luminance distribution of the particular eye-iris region.

13. The image processing device of claim 1, wherein the processing module is further configured to:
  determine an eye-iris code for the particular eye-iris pattern;
  wherein the eye-iris code is a numerical representation derived from the particular eye-iris pattern based on an analysis of the particular eye-iris pattern;
  scramble at least a portion of the eye-iris code to generate a scrambled eye-iris code that is different from the eye-iris code;
  based on the scrambled eye-iris code, generate the substitute eye-iris pattern corresponding to the scrambled eye-iris code; and
  based on the substitute eye-iris pattern, generate the substitute eye-iris region comprising the substitute eye-iris pattern.

14. A method comprising:
  acquiring an image including one or more face regions;
  selecting, from said one or more face regions, a particular face region that includes one or more eye-iris regions;
  analyzing the one or more eye-iris regions to select a particular eye-iris region that comprises a particular eye-iris pattern, which allows to biometrically identify a person depicted in said image;
  wherein said analyzing further comprises:
    submitting one or more eye-iris patterns, from the one or more eye-iris regions, to a biometric authentication unit (BAU);
    for the particular eye-iris pattern, from the one or more eye-iris patterns:
      receiving, from the BAU, a BAU generated eye-iris code confirming that the particular eye-iris pattern is of a quality insufficient to biometrically identify an individual;
      adjusting a contrast of the particular eye-iris pattern; and
      in response to adjusting the contrast of the particular eye-iris pattern, re-submitting the adjusted particular eye-iris pattern to the BAU for confirming that the adjusted particular eye-iris pattern is of a quality sufficient to biometrically identify the individual;
  generating a substitute eye-iris region comprising a substitute eye-iris pattern that is distinct from the particular eye-iris pattern included in the particular eye-iris region;
  wherein the substitute eye-iris pattern does not allow to biometrically identify said person;
  replacing, in the particular face region, the particular eye-iris region with the substitute eye-iris region;
  storing, in a storage device, said image, which includes the substitute eye-iris region in the particular face region; and
  wherein said method is performed by one or more computing devices.

15. The method of claim 14, wherein said analyzing further comprises:
  determining a local contrast of the particular eye-iris region between a pupil and a sclera; and based on the local contrast, determining that the particular eye-iris region has a quality sufficient to biometrically identify an individual.

16. The method of claim 14, wherein said generating the substitute eye-iris region further comprises:
retrieving two or more eye-iris patterns from the storage device;
segmenting the two or more eye-iris patterns to generate a plurality of eye-iris segments; and
generating the substitute eye-iris region from two or more eye-iris segments of the plurality of eye-iris segments that have a similar angle of segmentation with each other.

17. The method of claim 14, further comprising:
comparing the substitute eye-iris pattern with the particular eye-iris pattern; and
based on the comparing, determining a distinction metric between the substitute eye-iris region and the particular eye-iris region.

18. The method of claim 14, wherein said generating the substitute eye-iris region further comprises:
determining an eye-iris code for the particular eye-iris pattern;
wherein the eye-iris code is a numerical representation derived from the particular eye-iris pattern based on an analysis of the particular eye-iris pattern;
scrambling at least a portion of the eye-iris code to generate a scrambled eye-iris code that is different from the eye-iris code;
based on the scrambled eye-iris code, generating the substitute eye-iris pattern corresponding to the scrambled eye-iris code; and
based on the substitute eye-iris pattern, generating the substitute eye-iris region comprising the substitute eye-iris pattern.

19. One or more non-transitory computer-readable storage medium, storing one or more instructions which, when executed by one or more processors, cause performance of:
acquiring an image including one or more face regions;
selecting, from said one or more face regions, a particular face region that includes one or more eye-iris regions;
analyzing the one or more eye-iris regions to select a particular eye-iris region that comprises a particular eye-iris pattern, which allows to biometrically identify a person depicted in said image;
submitting one or more eye-iris patterns, from the one or more eye-iris regions, to a biometric authentication unit (BAU);
for the particular eye-iris pattern, from the one or more eye-iris patterns:
receiving, from the BAU, a BAU generated eye-iris code confirming that the particular eye-iris pattern is of a quality insufficient to biometrically identify an individual;
adjusting a contrast of the particular eye-iris pattern;
in response to adjusting the contrast of the particular eye-iris pattern, re-submitting the adjusted particular eye-iris pattern to the BAU for confirming that the adjusted particular eye-iris pattern is of a quality sufficient to biometrically identify the individual;
generating a substitute eye-iris region comprising a substitute eye-iris pattern that is distinct from the particular eye-iris pattern included in the particular eye-iris region;
wherein the substitute eye-iris pattern does not allow to biometrically identify said person;
replacing, in the particular face region, the particular eye-iris region with the substitute eye-iris region; and
storing, in a storage device, said image, which includes the substitute eye-iris region in the particular face region.

20. The one or more non-transitory computer-readable storage medium of claim 19, wherein the one or more instructions, when executed, cause:
determining a local contrast of the particular eye-iris region between a pupil and a sclera; and
based on the local contrast, determining that the particular eye-iris region has a quality sufficient to biometrically identify an individual.

21. The one or more non-transitory computer-readable storage medium of claim 19, wherein the one or more instructions, when executed, cause:
retrieving two or more eye-iris patterns from the storage device;
segmenting the two or more eye-iris patterns to generate a plurality of eye-iris segments; and
generating the substitute eye-iris region from two or more eye-iris segments of the plurality of eye-iris segments that have a similar angle of segmentation with each other.

22. The one or more non-transitory computer-readable storage medium of claim 19, wherein the one or more instructions, when executed, cause:
comparing the substitute eye-iris pattern with the particular eye-iris pattern; and
based on the comparing, determining a distinction metric between the substitute eye-iris region and the particular eye-iris region.

23. The image processing device of claim 13, wherein the eye-iris code is a binary sequence and the scrambled eye-iris code is derived by flipping one or more bits in the eye-iris code.

24. The image processing device of claim 23, wherein the one or more bits in the eye-iris code are selected randomly.

25. The one or more non-transitory computer-readable storage medium of claim 19, wherein the instructions, when executed, cause:
determining an eye-iris code for the particular eye-iris pattern;
wherein the eye-iris code is a numerical representation derived from the particular eye-iris pattern based on an analysis of the particular eye-iris pattern;
scrambling at least a portion of the eye-iris code to generate a scrambled eye-iris code that is different from the eye-iris code;
based on the scrambled eye-iris code, generating the substitute eye-iris pattern corresponding to the scrambled eye-iris code; and
based on the substitute eye-iris pattern, generating the substitute eye-iris region comprising the substitute eye-iris pattern.

* * * * *